(12) United States Patent
Ishiwata

(10) Patent No.: US 6,671,140 B1
(45) Date of Patent: Dec. 30, 2003

(54) MAGNETIC HEAD USING A MAGNETORESISTANCE EFFECT BASED ON FERROMAGNETIC JUNCTION, AND MAGNETIC RECORDING/REPRODUCING APPARATUS USING THE SAME

(75) Inventor: Nobuyuki Ishiwata, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/576,775

(22) Filed: May 23, 2000

(30) Foreign Application Priority Data

May 25, 1999 (JP) .......................................... 11-145312

(51) Int. Cl.[7] ............................................. G11B 5/139
(52) U.S. Cl. .................................................. 360/324.2
(58) Field of Search ............................... 360/324.2, 125, 360/126

(56) References Cited

U.S. PATENT DOCUMENTS

| | | | | |
|---|---|---|---|---|
| 5,759,681 A | * | 6/1998 | Hosoe et al. | 428/332 |
| 5,898,547 A | * | 4/1999 | Fontana, Jr. et al. | 360/113 |
| 5,905,611 A | * | 5/1999 | Yoda et al. | 360/324.1 |
| 6,088,179 A | * | 7/2000 | Sugahara et al. | 360/324.2 |

FOREIGN PATENT DOCUMENTS

| | | | | |
|---|---|---|---|---|
| JP | 8-147637 | 6/1996 | ............ | G11B/5/39 |
| JP | 9-251622 | 9/1997 | ............ | G11B/5/39 |
| JP | 10-162327 | 6/1998 | ............ | G11B/5/39 |
| JP | 10-320721 | 12/1998 | ............ | G11B/5/39 |
| JP | 11-025425 | 1/1999 | ............ | G11B/5/39 |

OTHER PUBLICATIONS

"A Magnetoresistive Readout Transducer" Hunt IEEE Transactions on Magnetics; vol. MAG7, No. 1, Mar. 1971; pp. 150–154.

"Design, Fabrication & Testing of Spin–Valve Read Heads for High Density Recording" Tsan et al IEEE Transactions on Magnetics, Vo. 30, No. 6, Nov. 1994, pp. 3801–3806.

"Ferromagnetics–insulator–ferromagnetic tunneling: Spin–dependent tunneling and large magnetoresistance in trilayer junctions (invited)" Moodera et al, J. Appl. Phys. 79 (8) Apr. 15, 1996, pp. 4724–4729.

\* cited by examiner

*Primary Examiner*—George J. Letscher
(74) *Attorney, Agent, or Firm*—Hayes Soloway P.C.

(57) ABSTRACT

A first magnetic layer (3) is laminated on a magnetic yoke film (2) forming a closed magnetic circuit containing a magnetic gap so as to be magnetically coupled to the magnetic yoke film (2), and a magnetic separation layer (4), a second magnetic layer (5) and an antiferromagnetic layer (6) are laminated on the first magnetic layer (3). Further, a pair of electrodes (1, 7) are formed so that the laminate comprising the above layers is sandwiched between the electrodes. A permanent magnet film 8 is disposed to apply a bias magnetic field to the first magnetic layer (3). The magnetic separation layer (4) is formed of an insulator. Tunnel current is made to flow between the electrodes (1, 7) through the magnetic separation layer (4), and magnetic signals in the magnetic yoke film (2) are detected by using the antiferromagnetic tunnel magnetoresistance effect that the tunnel current is varied in accordance with variation of the difference in the magnetization direction between the first magnetic layer (3) and the second magnetic layer (5).

26 Claims, 11 Drawing Sheets

PRIOR ART

MAGNETIC HEAD USING A MAGNETORESISTANCE EFFECT BASED ON FERROMAGNETIC JUNCTION, AND MAGNETIC RECORDING/REPRODUCING APPARATUS USING THE SAME

BACKGROUND OF THE INVENTION

1. Field of the Invention

The present invention relates to a magnetic information recording/reproducing field, particularly to a magnetic head and a magnetic recording/reproducing apparatus for recording/reproducing information on a magnetic recording medium by using the magnetic head, and more particularly to a magnetic head using a magnetoresistance effect based on ferromagnetic tunnel junction, a method of manufacturing the magnetic head, and a magnetic recording/reproducing apparatus using the magnetic head.

2. Description of the Related Art

In connection with recent compact and large-capacity design of magnetic recording/reproducing apparatuses, a magnetoresistance effect type head capable of realizing a large reproduction output (hereinafter referred to as "MR head") has been practically used. The MR head has been disclosed in a paper titled "A Magnetoresistivity Readout Transducer" of "IEEE Trans. on Magn., MAG7 (1971) 150", for example. NiFe film is generally used as the magnetoresistance effect material, and in the case of a magnetoresistance effect type element (hereinafter referred to as "MR element") using the NiFe film, the magnetoresistance variation rate corresponding to the reproduction output of the head is equal to about 2 to 3%.

Figure 14:
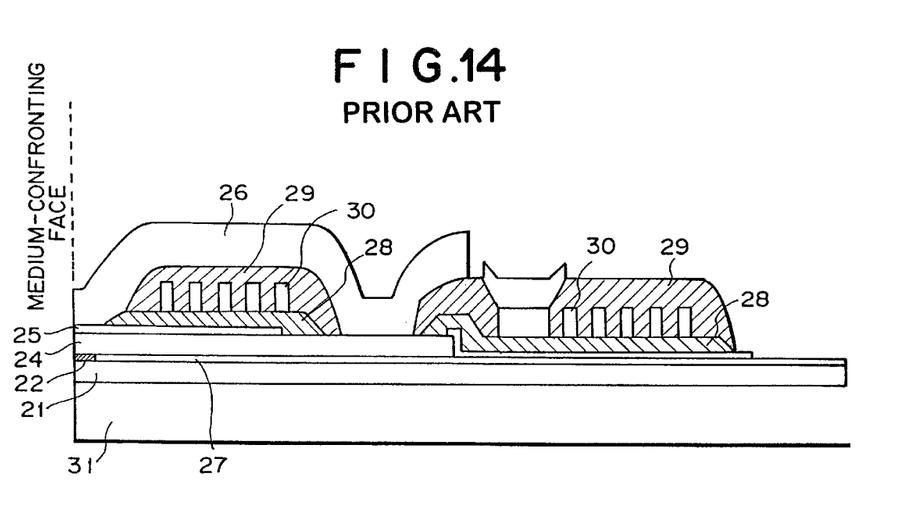
FIG. 14 is a cross-sectional view showing the conventional MR head.
Figure 15:
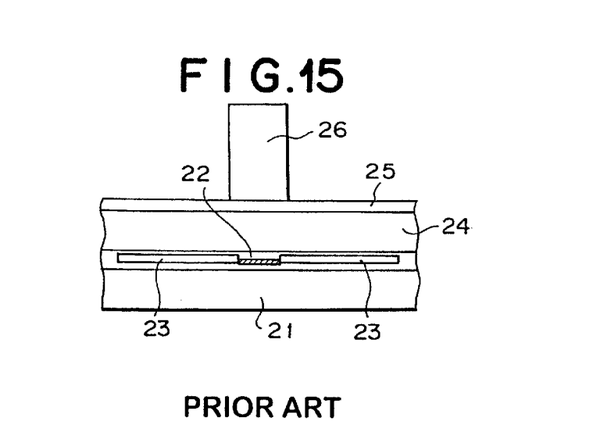
FIG. 15 is a front view showing the conventional MR head.

FIG. 14 is a cross-sectional view showing a composite magnetic head (hereinafter referred to as "composite head") equipped with a reproducing head based on an MR element and a recording head based on an inductive element (induction type element), and FIG. 15 shows the structure of the composite head which is viewed from the magnetic recording medium confronting face (generally called as "air bearing surface [ABS]").

A magnetic shield 21 is formed on a base 31 serving as a slider, and an MR element is formed through an insulating layer used to establish electrical insulation. The MR element has a central area 22 for sensing the magnetic field from the magnetic recording medium, and an end portion area 23 comprising a ferromagnetic layer for applying bias magnetic field to the central area 22 and a conductive layer for supplying current. A magnetic shield 24 is further formed through an insulating layer. The above parts constitute a reproduction element portion The magnetic shield 24 also functions as one of recording magnetic poles, and it is paired with the other recording magnetic pole 26 formed through a recording gap 25. A coil 30 is provided between the magnetic shield 24 serving as one recording magnetic pole and the other recording magnetic pole 26 so as to be located slightly inside away from the ABS while insulated by insulators 28, 29 such as photoresist or the like, and these recording magnetic poles are exited (magnetized) by the magnetic field occurring when current flows through the coil. The above parts constitute a recording element portion.

Recently, much attention has been paid to a GMR head which aims to enhance the recording density by using a giant magnetoresistance effect film (GMR film) at the central area of the MR head to further increase the output power. With respect to the GMR film, particularly a magnetoresistance effect, generally called as "spin valve effect" in which the resistance variation corresponds to the cosine defined by the magnetization directions of two adjacent magnetic layers is starting to be practically applied to next-generation MR heads because a large resistance variation can be obtained by a small operating magnetic field. The MR head using the spin valve effect is described in a paper titled "Design, Fabrication & Testing of Spin-Valve Read Heads for High Density Recording", IEEE Trans. on Magn., Vol. 30, No. 6 (1994) 3801. The resistance variation rate of the GMR film using the spin valve is equal to about ten and several % at maximum, and thus the practical value in consideration of noises of a magnetic head (hereinafter merely referred to as "head") is equal to about 7%.

A ferromagnetic tunnel junction element has such a structure that a tunnel barrier layer formed of an extremely thin insulator of nano-meter order is sandwiched between two ferromagnetic layers. According to the ferromagnetic tunnel junction element, when an external magnetic field is applied in the direction along the ferromagnetic layers while fixed current flows between the ferromagnetic layers sandwiching the tunnel barrier layer from both the sides thereof, there appears a magnetoresistance effect corresponding to the relative angle between the magnetization directions of the ferromagnetic layers (this phenomenon is hereinafter referred to as Recently, it has been reported that a magnetoresistance element exhibiting a magnetoresistance variation rate exceeding 20% is achieved by using a surface oxide film of Al as a tunnel barrier layer. For example, "Journal of Applied Physics, vol. 79, pp4724 to 4729, April 1996" has reported such a large magnetoresistance variation rate. According to this publication, a first ferromagnetic layer of CoFe is formed on a glass substrate by a vacuum deposition method using a deposition mask, and then the mask is exchanged by another to form an Al layer of 1.2 to 2.0 nm in thickness by the vacuum deposition method. The surface of the Al layer thus formed is exposed to oxygen to form a tunnel barrier layer made of alumina. Finally, a second ferromagnetic layer of Co is formed so as to be superposed on the first ferromagnetic layer through the tunnel barrier layer, thereby completing a cross-shaped electrode type ferromagnetic tunnel junction element. According to this method, it has been theoretically expected that the magnetoresistance variation rate of about 50% is achievable.

By applying the element using TMR as described above to a reproduction head, a magnetic head of higher output power than GMR can be implemented. However, IVR as described above needs to apply a voltage across two adjacent ferromagnetic layers between which an extremely thin insulating layer of 2 nm or less is sandwiched, and thus it has an extremely high risk of dielectric breakdown. Particularly the head to which the structure shown in FIGS. 14 and 15 is applied has a higher risk of electrostatic breakdown of the tunnel barrier layer because the end face of the laminate film of TMR is exposed at the medium confronting face.

SUMMARY OF THE INVENTION

Therefore, an object of the present invention is to provide a magnetic head which can suppress occurrence of dielectric breakdown of a tunnel barrier layer while using TRR having a magnetoresistance variation higher than conventional GMR.

Further, another object of the present invention is to provide a composite magnetic head having a TMR reproducing magnetic head and an inductive recording magnetic head in which low-noise reproduction can be performed even when the gap between the head and a magnetic recording medium is small.

Still further, another object of the present invention is to provide a composite magnetic head having an inductive recording magnetic head and a TMR reproducing magnetic head in which high-density recording of a narrow track width can be performed on a magnetic recording medium.

In addition, a further object of the present invention is to provide a method of manufacturing the magnetic head as described above.

A further object of the present invention is to provide a magnetic recording/reproducing apparatus using the magnetic head as described above.

In order to attain the above objects, according to a first aspect of the present invention, there is provided a magnetic head comprising: a magnetic yoke film (magnetic yoke) forming a closed magnetic circuit containing a magnetic gap; a first magnetic layer which is laminated on the magnetic yoke film and magnetically coupled to the magnetic yoke film; a second magnetic layer laminated on the first magnetic layer through a magnetic separation layer; and a pair of electrodes which are formed so that the laminate comprising the magnetic yoke film, the first magnetic layer, the magnetic separation layer and the second magnetic layer is sandwiched therebetween, wherein a magnetic signal in the magnetic yoke film is detected by using a magnetoresistance effect based on the difference between the magnetization direction of the first magnetic layer and the magnetization direction of the second magnetic layer.

In an embodiment of the present invention, the magnetization direction of the second magnetic layer is fixed by laminating an antiferromagnetic layer on the second magnetic layer. In an embodiment of the present invention, a bias magnetic field is applied to the first magnetic layer by a permanent magnet film disposed adjacent to the first magnetic layer in respect of the direction parallel to the surface of the first magnetic layer. In an embodiment of the present invention, the magnetic separation layer is formed of an insulating material, tunnel current is made to flow between the pair of electrodes through the magnetic separation layer, and there is used a ferromagnetic tunnel magnetoresistance effect that the tunnel current is varied in accordance with variation of the difference between the magnetization direction of the first magnetic layer and the magnetization direction of the second magnetic layer. In an embodiment of the present invention, a coil is wound around the magnetic yoke film.

According to a second aspect of the present invention, there is provided a method for manufacturing the magnetic head of the first aspect of the present invention comprising the steps of:

forming a coil lower side portion on a substrate, and forming a lower side insulating film on the coil lower side portion so as to cover the coil lower side portion;

forming a lower side electrode of the pair of electrodes on the lower side insulating film;

forming the magnetic yoke film on the lower side electrode;

laminating on the magnetic yoke film the first magnetic layer, the magnetic separation layer, the second magnetic layer and an antiferromagnetic layer for fixing the magnetization direction of the second magnetic layer;

forming a permanent magnet film for applying a bias magnetic field to the first magnetic layer so that the permanent magnet film is adjacent to the first magnetic layer in respect of the film surface direction of the first magnetic layer; and forming an upper side electrode of the pair of electrodes so that the upper side electrode is connected to the second magnetic layer, and forming a coil upper side portion so that the coil upper side portion is connected to the coil lower side portion so as to form a coil wound around the magnetic yoke film.

In an embodiment of the present invention, the magnetic gap of the magnetic yoke film is formed by an etching treatment using a focused ion beam. In an embodiment of the present invention, when forming the upper side electrode and forming the coil upper side portion, after an upper side insulating film is formed on the overall surface, openings are formed at the portion of the upper side insulating film corresponding to the antiferromagnetic layer and the portion corresponding to the connection portion of the coil lower side portion with the coil upper side portion, a conductive film is formed and then the conductive film is patterned.

According to a third aspect of the present invention, there is provided a magnetic head comprising: a first magnetic layer serving as a magnetic yoke film (magnetic yoke) forming a closed magnetic circuit containing a magnetic gap; a second magnetic layer laminated on the first magnetic layer through a magnetic separation layer; and a pair of electrodes formed so that the laminate comprising the first magnetic layer, the magnetic separation layer and the second magnetic layer is sandwiched by the electrodes, wherein a magnetic signal in the magnetic yoke film is detected by using a magnetoresistance effect based on the difference between the magnetization direction of the first magnetic layer and the magnetization direction of the second magnetic layer.

In an embodiment of the present invention, the magnetization direction of the second magnetic layer is fixed by laminating an antiferromagnetic layer on the second magnetic layer. In an embodiment of the present invention, a bias magnetic field is applied to the first magnetic layer by a permanent magnet film disposed adjacent to the first magnetic layer in respect of the direction parallel to the surface of the first magnetic layer. In an embodiment of the present invention, the magnetic separation layer is formed of an insulating material, tunnel current is made to flow between the pair of electrodes through the magnetic separation layer, and there is used a ferromagnetic tunnel magnetoresistance effect that the tunnel current is varied in accordance with variation of the difference between the magnetization direction of the first magnetic layer and the magnetization direction of the second magnetic layer. In an embodiment of the present invention, a coil is wound around the magnetic yoke film.

According to a fourth aspect of the present invention, there is provided a method of manufacturing the magnetic head of the third aspect of the present invention comprising the steps of:

forming a coil lower side portion on a substrate, and then forming a lower side insulating film on the coil lower side portion so that the lower side insulating film covers the coil lower side portion;

forming a lower side electrode of the pair of electrodes on the lower side insulating film;

forming the magnetic yoke film serving as the first magnetic layer on the lower side electrode, and then laminating the magnetic separation layer, the second magnetic layer and the antiferromagnetic layer for fixing the magnetization direction of the second magnetic layer;

forming the permanent magnet film for applying a bias magnetic field to the first magnetic layer so that the permanent magnetic film is adjacent to the first magnetic layer in respect of the film surface direction of the first magnetic layer; and forming an upper side electrode of the pair of electrodes so that the upper side electrode is connected to the second magnetic layer, and then forming a coil upper side portion so that the coil upper side portion is connected to the coil lower side portion to form a coil wound around the magnetic yoke film.

In an embodiment of the present invention, the magnetic gap of the magnetic yoke film is formed by an etching treatment using a focused ion beam. In an embodiment of the present invention, when forming the upper side electrode and forming the coil upper side portion, after the upper side insulating film is formed on the overall surface, openings are formed at the portion of the upper side insulating film corresponding to the antiferromagnetic layer and the portion corresponding to the connection portion of the coil lower side portion with the coil upper side portion, a conductive film is formed and then the conductive film is patterned.

According to a fifth aspect of the present invention, a magnetic recording/reproducing apparatus for recording/ reproducing information through a magnetic head on/from a magnetic recording medium, is characterized in that the magnetic head is any one of the magnetic head of the first or third aspect of the present invention, and the magnetic head is movable along the surface of the magnetic yoke film relatively to the magnetic recording medium.

In an embodiment of the present invention, the information is recorded/reproduced while the gap between the magnetic recording medium and the magnetic head is kept to be 40 nm or less. In an embodiment of the present invention, the magnetic recording medium is a flexible tape-shaped medium obtained by forming a magnetic recording layer on a flexible substrate, a flexible disc-shaped medium obtained by forming a magnetic recording layer on a flexible substrate, or a medium obtained by forming a magnetic recording layer on a substrate of a rigid body. In an embodiment of the present invention, the magnetic recording layer is a magnetic thin film formed by a physical vapor deposition method.

According to the present invention, not only a magnetic head which suppresses occurrence of the electrostatic breakdown of the tunnel barrier layer can be provided while using TMR which gains a magnetoresistance variation exceeding that of conventional GMR, but also the recording track width corresponding to the thickness of the magnetic yoke film can be obtained, so that a magnetic head capable of realizing an extremely small track width can be implemented. Further, the magnetic yoke for the recording element is also used as the magnetic yoke for the reproducing element, so that the number of manufacturing steps can be reduced and the cost can be easily lowered.

Further, in the case of TMR, the resistance value of the element also reflects the resistance of the tunnel barrier layer serving as the insulator, and thus the resistance value of the element is liable to be high. However, according to the present invention, the area of the TPR film can be set to be relatively large, so that the resistance value of the element can be sufficiently reduced.

As described above, according to the present invention, there can be implemented a magnetic head which can reduce the number of manufacturing steps, lower the manufacturing cost, facilitate the narrow track design and suppress noises appending to the conventional MR head such as thermal asperity even in a high-density magnetic recording/ reproducing area where the gap between the magnetic recording medium and the head is equal to 40 nm or less, by using DZR having a large magnetoresistance variation exceeding that of conventional GMR and commonly using the magnetic yoke for recording and reproduction. In addition, according to the present invention, there can be implemented a magnetic recording/reproducing apparatus using such a magnetic head. Further, according to the magnetic head of the present invention, the TMR film is not exposed at the medium confronting face, so that occurrence of the electrostatic breakdown of the tunnel barrier layer can be suppressed.

DETAILED DESCRIPTION OF THE PREFERRED EMBODIMENTS

Preferred embodiments according to the present invention will be described hereunder with reference to the accompanying drawings.

[First Embodiment]

Figure 1:
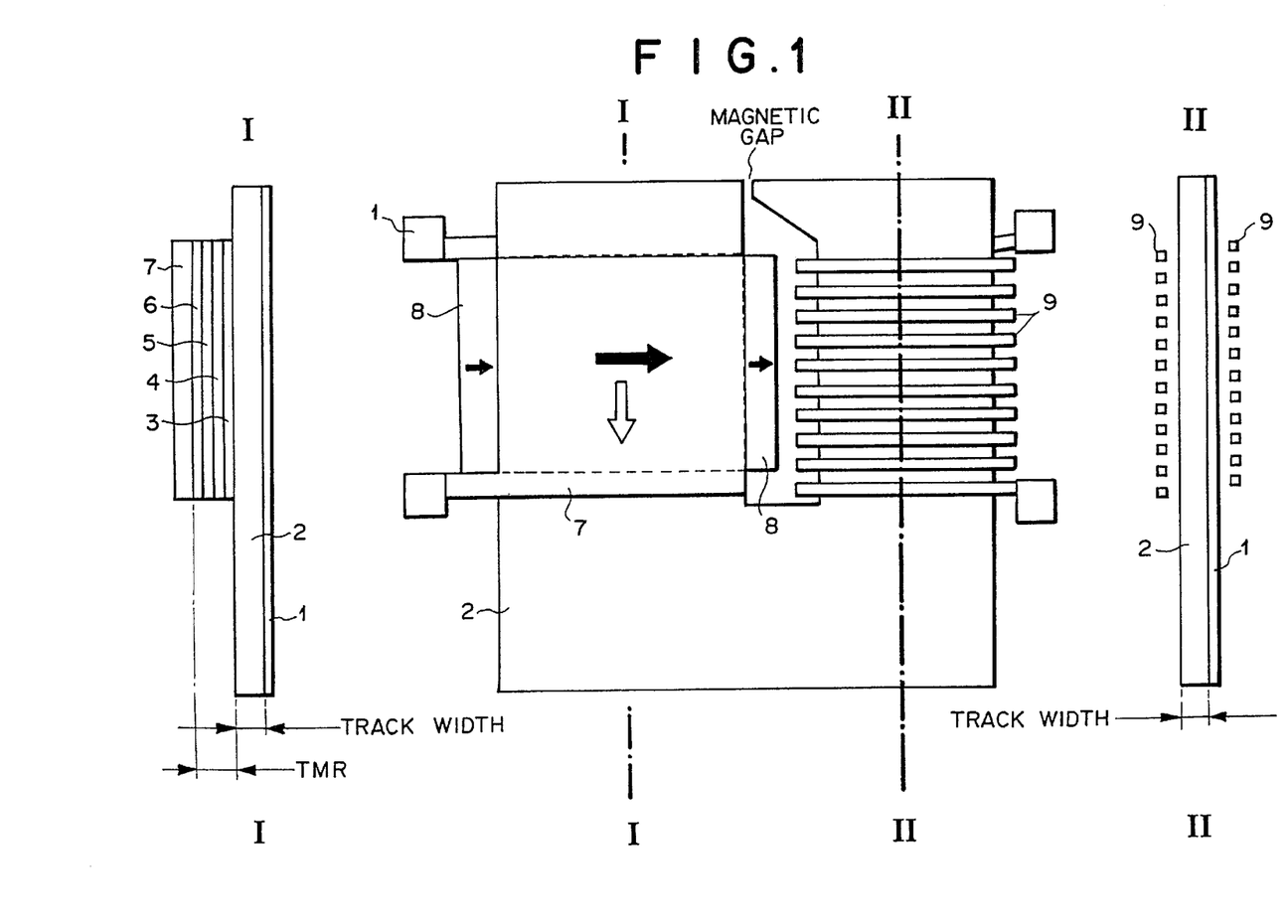
FIG. 1 is a diagram showing a first embodiment of a magnetic head according to the present invention.

FIG. 1 shows a first embodiment of a magnetic head according to the present invention. The center of FIG. 1 is a front view of the magnetic head, and the left and right sides of FIG. 1 are sectional view and II—II sectional view of the front view of FIG. 1.

A coil 9 is wound around a magnetic yoke 2 forming a closed magnetic circuit containing a magnetic gap. By supplying current to the coil 9, the magnetic yoke 2 is excited and a magnetic signal is recorded onto a magnetic recording medium by leakage magnetic flux from the magnetic gap.

A TMR film comprises a first magnetic layer 3 which is formed on the magnetic yoke 2 so as to be magnetically coupled to the magnetic yoke 2 and whose magnetization is moved interlockingly with the magnetization of the magnetic yoke, a magnetic separation layer 4 of alumina formed on the first magnetic layer 3, a second magnetic layer 5 formed on the magnetic separation layer 4, and an antiferromagnetic layer 6 formed on the second magnetic layer 5. The magnetization of the second magnetic layer 5 is fixed in the downward direction (↓direction) by the antiferromagnetic layer 6 in FIG. 1.

As shown in the front view of FIG. 1, the first magnetic layer 3 is sandwiched from both the sides thereof by a permanent magnet film 8. The magnetization of the permanent magnet film 8 is fixed in the right direction (→direction) in the front view of FIG. 1, whereby the magnetization of the first magnetic layer 3 is fixed also in the right direction (→direction) in the plan view of FIG. 1. Further, a pair of electrodes 1 and 7 are provided so as to sandwich the magnetic yoke 2 and the TMR film from the front and back sides thereof. By applying a voltage across the electrodes, current can flow in the direction perpendicular to the surface of TMR film. With this structure, the magnetization of the first magnetic layer 3 of the TMR film is rotated in accordance with the magnetic signal from the magnetic recording medium which is introduced from the magnetic gap of the magnetic yoke 2 into the magnetic yoke, and the relative angle between the magnetization of the first magnetic layer 3 and the magnetization of the second magnetic layer 5 is varied, whereby the resistance variation corresponding to the variation of the relative angle can be detected.

The magnetic yoke 2 may be formed of permalloy (NiFe alloy). The coil 9 and the electrodes 1, 7 may be formed of Cu. The TMR film may be designed so that the first magnetic layer 3 is formed of permalloy (NiFe alloy), the magnetic separation layer 4 is formed of alumina, the second magnetic layer 5 is formed of Co and the antiferromagnetic layer 6 is formed of PtMn alloy.

The thickness of the magnetic yoke 2 may be suitably selected in accordance with the magnetic information recording density on the magnetic recording medium, and for example it may be suitably set to the range from 0.01 μm to 5 μm. In the TMR film, the first magnetic layer 3 preferably ranges from 2 nm to 20 nm in thickness, the magnetic separation layer 4 preferably ranges from 0.4 nm to 2 nm in thickness, the second magnetic layer 5 preferably ranges from 2 nm to 20 nm in thickness, and the antiferromagnetic layer 6 preferably ranges from 2 nm to 50 nm in thickness.

The magnetic yoke 2 may be formed of a Sendust film containing FeSiAl alloy as the main ingredient, microcrystalline film containing Fe as the main ingredient such as FeTaN alloy or the like, or amorphous film containing Co as the main ingredient such as CoTaZr alloy or the like.

The first magnetic layer 3 of the TMR film may be designed in a lamination structure containing CoFe alloy and NiFe alloy arranged from the magnetic separation layer side in this order. The second magnetic layer 5 may be formed of CoFe ally. On the basis of these combinations, for example when the first magnetic layer 3 is designed in a lamination structure having CoFe alloy and NiFe alloy and the second magnetic layer 5 is formed of CoFe alloy, a TMR film having a resistance variation rate of 50% can be obtained.

The antiferromagnetic layer 6 may be formed of Mn—M alloy (M is at least one element selected from Cr, Fe, Co, Ni, Ru, Rh, Pd, Ir, Pt), Ni oxide or Fe oxide.

The magnetic head of this embodiment is movable in the right-and-left direction relatively to the magnetic recording medium in the front view of FIG. 1. Accordingly, the track width of the magnetic recording corresponds to the film thickness of the magnetic yoke 2, and high recording density having an extremely small track width of 1 μm or less can be achieved.

Further, the TMR film is not exposed at the medium confronting face, and thus the occurrence of the electrostatic breakdown of the tunnel barrier layer can be suppressed.

[Second Embodiment]

Figure 2:
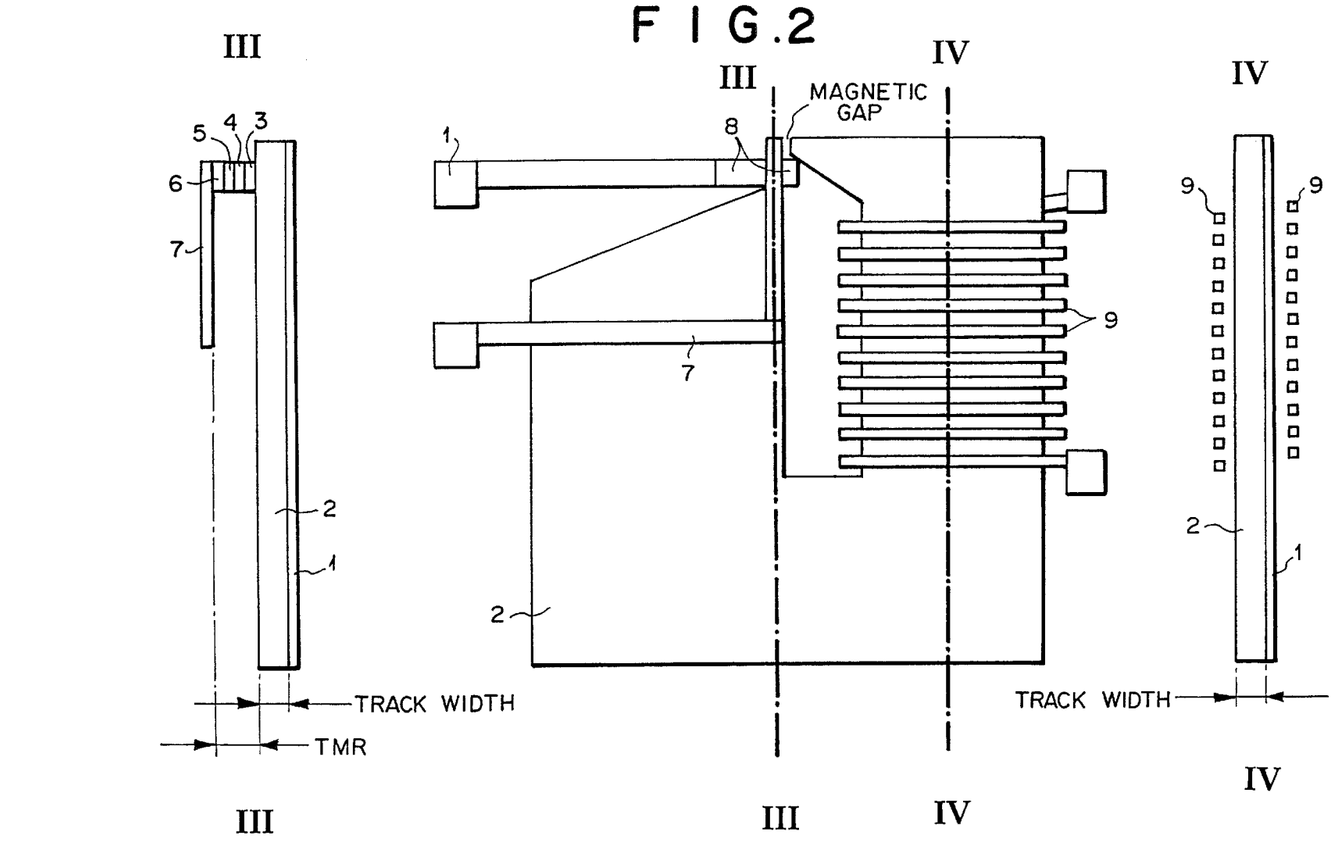
FIG. 2 is a diagram showing a second embodiment of the magnetic head according to the present invention.

FIG. 2 shows a second embodiment of the magnetic head of the present invention. The center of FIG. 2 is a front view and the left and right sides of FIG. 2 are III—III sectional view and IV—IV sectional view of the front view of FIG. 2.

The basic layer structure of this embodiment is the same as the first embodiment. However, in this embodiment, BIR is intentionally concentrated to the vicinity of the magnetic gap on the magnetic yoke. The reproduction power can be increased by providing TMR in the neighborhood of the magnetic gap where a large magnetization rotational angle in the magnetic yoke is obtained as described above.

[Third Embodiment]

Figure 3:
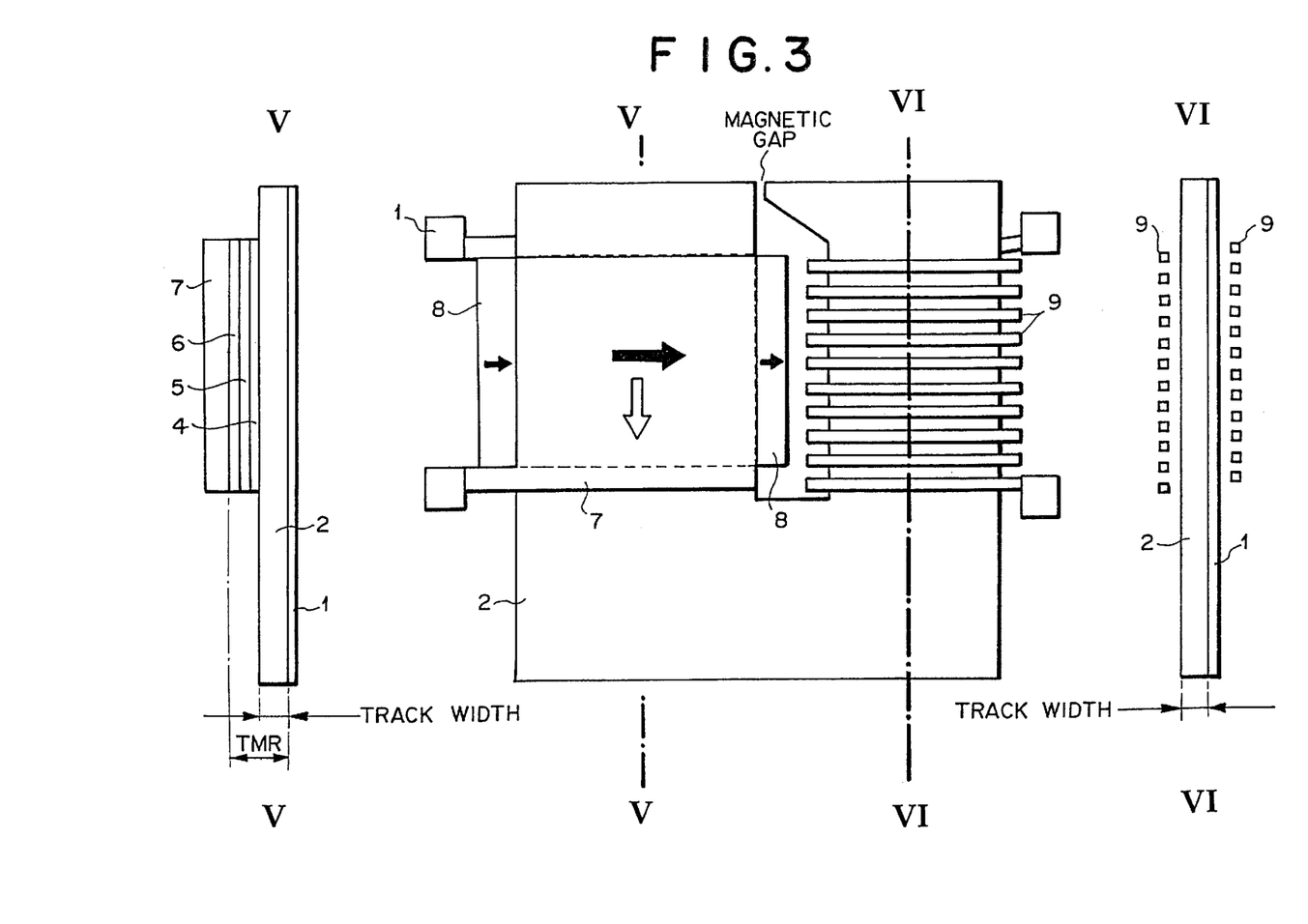
FIG. 3 is a diagram showing a third embodiment of the magnetic head according to the present invention.

FIG. 3 shows a third embodiment of the magnetic head according to the present invention. The center of FIG. 3 is a front view of the magnetic head, and the left and right sides of FIG. 3 are V—V sectional view and VI—VI sectional view of the front view of FIG. 3.

As shown in FIG. 3, a coil 9 is wound around a magnetic yoke 2 forming a closed magnetic circuit containing a magnetic gap. By supplying current to the coil 9, the magnetic yoke 9 is excited and magnetic signals are recorded on the magnetic recording medium by the leakage magnetic flux from the magnetic gap.

A TMR film comprises a first magnetic layer 3 serving as the magnetic yoke 2, a magnetic separation layer 4 of alumina formed on the first magnetic layer 3, a second magnetic layer 5 formed on the magnetic separation layer 4 and an antiferromagnetic layer 6 formed on the second magnetic layer 5. The magnetization of the second magnetic layer 5 is fixed in the downward direction (↓direction) in FIG. 3 by the antiferromagnetic layer 6. As shown in the front view of FIG. 3, the magnetic yoke portion serving as the first magnetic layer in the area in which the current flows is sandwiched from both the sides thereof by permanent magnet film 8, and the magnetization of the magnetic yoke portion serving as the first magnetic layer is fixed in the right direction (→direction) in the front view of FIG. 3 by fixing the magnetization of the permanent magnet film 8 in the right direction (→direction) in the front view of FIG. 3. Electrodes 1 and 7 which are paired with each other are provided so as to sandwich the magnetic yoke 2 and the TMR film containing the magnetic yoke 2 from the front and back sides, and current can be made flow through the TMR film in the direction perpendicular to the surface of TMR film by applying a voltage across the electrodes 1 and 7. Accordingly, the magnetization of the magnetic yoke (first magnetic layer 3) is rotated in connection with the magnetic signal from the magnetic recording medium which is introduced into the magnetic yoke from the magnetic gap of the magnetic yoke 2, and the relative angle between the magnetization of the magnetic yoke and the magnetization of the second magnetic layer 5 is varied, whereby the resistance variation corresponding to the variation of the relative angle can be detected.

The magnetic yoke 2 may be formed of permalloy (NiFe alloy). The coil 9 and the electrodes 1, 7 may be formed of Cu. In the TMR film, the first magnetic layer 3 may be served by the magnetic yoke 2, and the magnetic separation layer 4, the second magnetic layer 5 and the antiferromagnetic layer 6 may be formed of alumina, Co and PtMn alloy, respectively.

The thickness of the magnetic yoke 2 is suitably determined in accordance with the recording density of magnetic information on the magnetic recording medium, and for example it preferably ranges from 0.01 $\mu$m to 5 $\mu$m. In the TMR film, the magnetic separation layer 4 preferably ranges from 0.4 nm to 2 nm in thickness, the second magnetic layer 5 preferably ranges from 2 nm to 20 nm in thickness, and the antiferromagnetic layer 6 preferably ranges from 2 nm to 50 nm in thickness.

The magnetic yoke 2 may be formed of a Sendust film containing FeSiAl alloy as the main ingredient, microcrystalline film containing Fe as the main ingredient such as FeTaN alloy or the like, or amorphous film containing Co as the main ingredient such as CoTaZr alloy or the like.

The magnetic yoke 2 which also serves as the first magnetic film 3 of the TMR film may be formed with a layer of CoFe alloy at the side near to the magnetic separation layer 4. The second magnetic layer 5 may be formed of CoFe alloy. When the magnetic yoke is designed in a laminate structure of CoFe alloy and NiFe alloy and the second magnetic layer 5 is formed of CoFe alloy by combining the above materials, TMR film having a resistance variation rate of 50% can be obtained.

The antiferromagnetic layer 6 may be formed of Mn—M alloy (M is an element selected from Cr, Fe, Co, Ni, Ru, Rh, Pd, Ir, Pt), Ni oxide or Fe oxide.

The magnetic head of this embodiment is designed to be movable in the right-and-left direction in the front view of FIG. 3. Accordingly, the track width of the magnetic recording corresponds to the film thickness of the magnetic yoke 2, and high recording density of extremely small width of 1 $\mu$m or less can be achieved.

Further, the TMR film is not exposed at the medium confronting face, and thus occurrence of electrostatic breakdown of the tunnel barrier layer can be suppressed.

[Fourth Embodiment]

Figure 4:
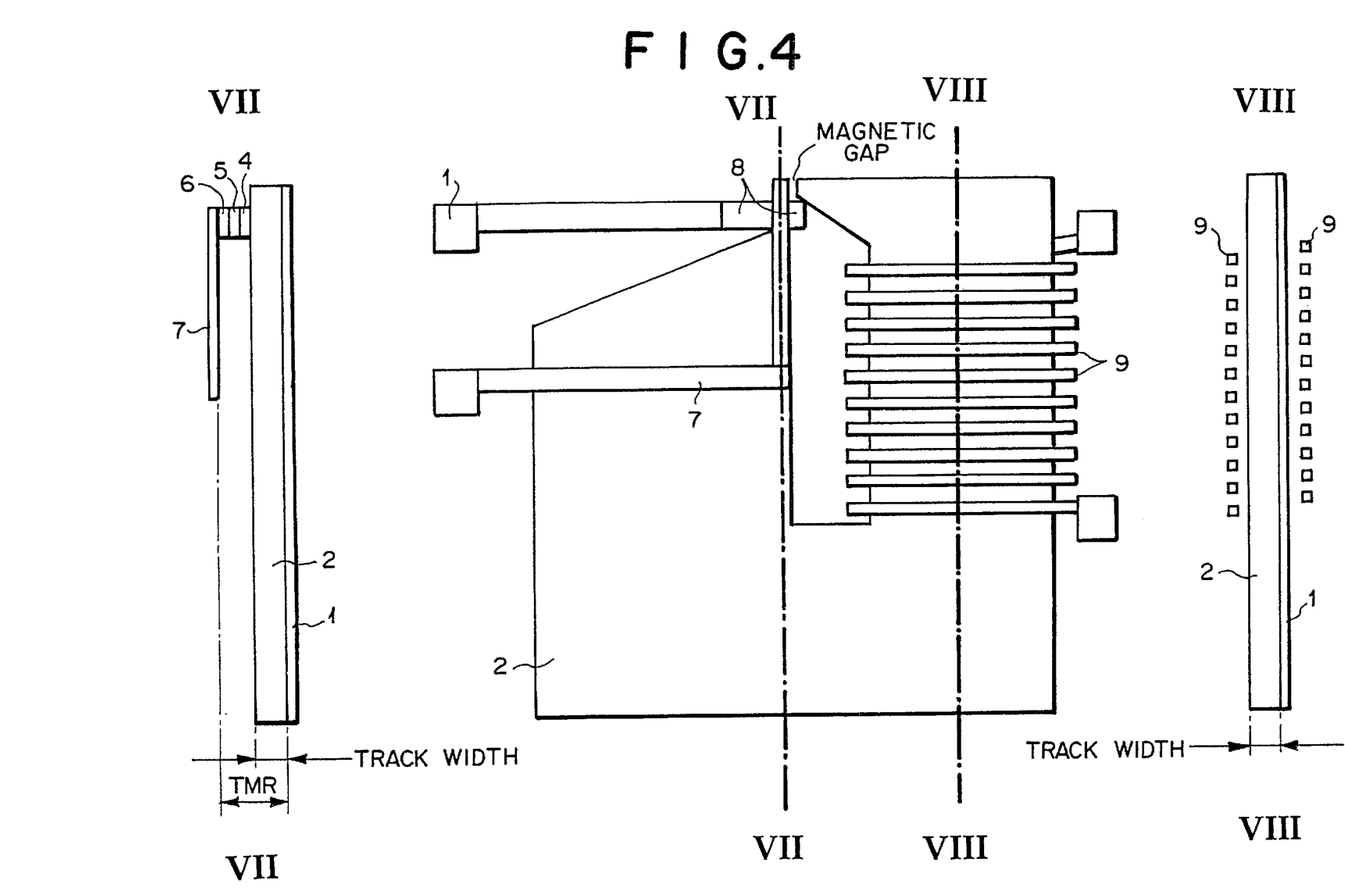
FIG. 4 is a diagram showing a fourth embodiment of the magnetic head according to the present invention.

FIG. 4 shows a fourth embodiment of the magnetic head according to the present invention. The center of FIG. 4 is a front view of the magnetic head, and the left and right sides of FIG. 4 are VII—VII sectional view and VII—VIII sectional view of the front view of FIG. 4.

The basic layer construction of the fourth embodiment is the same as the third embodiment. However, in the fourth embodiment, TMR is designed so that the TMR is intentionally concentrated in the neighborhood of the magnetic gap on the magnetic yoke. By providing IWR in the neighborhood of the magnetic gap where a large magnetization rotational angle in the magnetic yoke is obtained as described above, the reproduction output can be increased.

[Fifth Embodiment]

Figure 5:
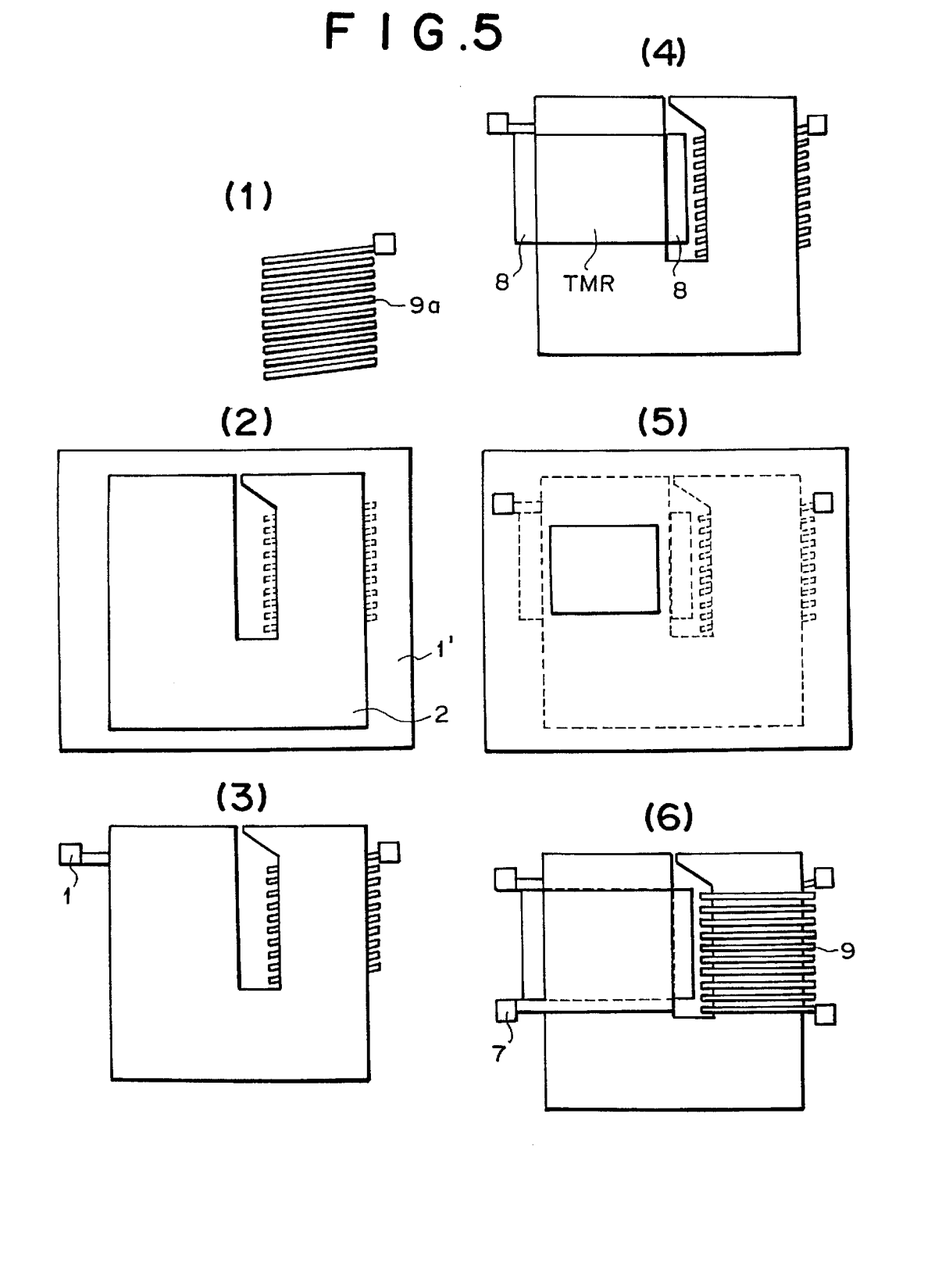
FIG. 5 is a process diagram showing an embodiment of a method of manufacturing the magnetic head shown in FIG. 1.

FIG. 5 shows a process diagram of an embodiment of a method of manufacturing the magnetic head of FIG. 1 according to the present invention.

As shown in FIG. 5(1), a lower side portion 9a of a coil which will be wound around a magnetic yoke is formed on a substrate obtained by forming an alumina film on a composite ceramic member of $Al_2O_3$ and TiC which will serve as a slider (the substrate exists behind the coil lower side portion 9a in FIG. 5). The coil lower side portion 9a may be formed by forming a desired pattern groove on the alumina film, forming a Cu seed layer on the alumina film through a sputtering treatment, depositing Cu through an electroplating treatment, and polishing the Cu film obtained and removing Cu of the portion other than the coil pattern for flattening through a chemical and mechanical polishing treatment (CMP). Thereafter, an alumina film is formed over all the surface to insulate the coil lower side portion 9a and the magnetic yoke which will be afterward formed.

Subsequently, as shown in FIG. 5(2), a Cu film 1' serving as a lower side electrode of a pair of electrodes between which TMR and the magnetic yoke are sandwiched is formed, and an NiFe film serving as the magnetic yoke is formed on the Cu film 1'. The NiFe film is patterned in a desired shape to form the magnetic yoke 2. At this time, since the magnetic gap is a very small value ranging from 0.03 $\mu$m to 0.5 $\mu$m, it is preferably formed by using a focused ion beam.

Subsequently, as shown in FIG. 5(3), the Cu film 1' is patterned in a desired shape to form a lower side electrode 1.

Subsequently, there are formed a PMR pattern comprising a first magnetic layer 3 of NiFe, a magnetic separation layer 4 of alumina, a second magnetic layer 5 of Co and an antiferromagnetic layer 6 of PtMn, and a permanent magnet film 8 of CoPt for applying a bias magnetic field to the first magnetic layer 3 of TMR as shown in FIG. 5(4).

Subsequently, as shown in FIG. 5(5), after the overall body is covered by an alumina insulating film, the connection portion of the coil lower side portion which will be connected to the coil upper side portion, the coil electrode end portion, the end portion of the lower side electrode and the alumina insulating film on the TMR pattern are removed to form corresponding openings.

Subsequently, as shown in FIG. 5(6), a Cu film is formed over all the surface so as to be filled in the openings formed in the step of FIG. 5(5), and then the Cu film is patterned in a desired shape to form an upper electrode 7 of TMR. In addition, the coil upper side portion is formed and connected to the coil lower side portion to form a coil 9, thereby obtaining the magnetic head shown in FIG. 1.

Figure 6:
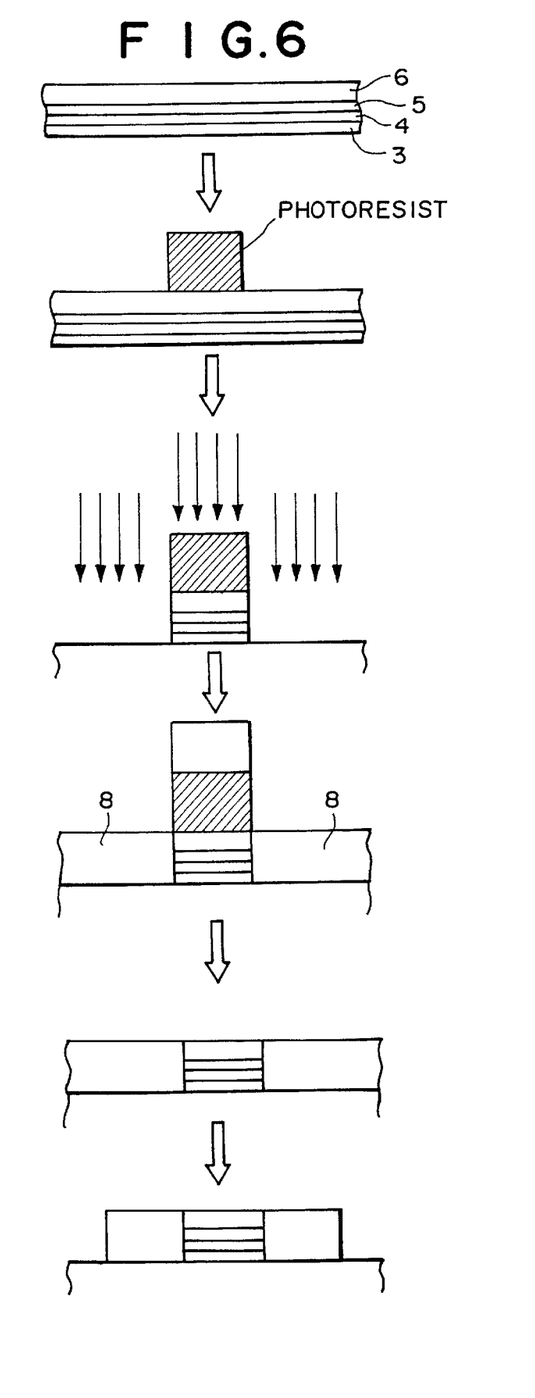
FIG. 6 is a diagram showing pattern formation of a TMR and a permanent magnet film in the process of FIG. 5.

The formation of the continuous pattern of TMR and the permanent magnet film in the step of FIG. 5(4) will be described in detail with reference to FIG. 6 (in FIG. 6, the order of the steps is indicated by heavy arrows). First, the TMR film (3 to 6) is formed by sputtering. Subsequently, a photoresist film is formed on the TMR film so as to have the pattern corresponding to a pattern of TMR which is wished to be left. Subsequently, the TMR film at an undesired portion is removed by an ion beam etching treatment using the photoresist film as a mask. Thereafter, the permanent magnet film 8 is formed by sputtering while the mask is left. Subsequently, the mask and the permanent magnet film thereon are removed by lift-off. Finally, a photoresist mask is formed so that the permanent magnet film at an undesired portion is exposed, and the permanent magnet film at the undesired portion is removed by the ion beam etching treatment, thereby removing the photoresist mask.

According to the method of manufacturing the magnetic head of the above embodiment, it is unnecessary to process the fine pattern corresponding to the track width of the magnetic recording when the TMR film is formed, so that the manufacturing can be easily performed.

[Sixth Embodiment]

Figure 7:
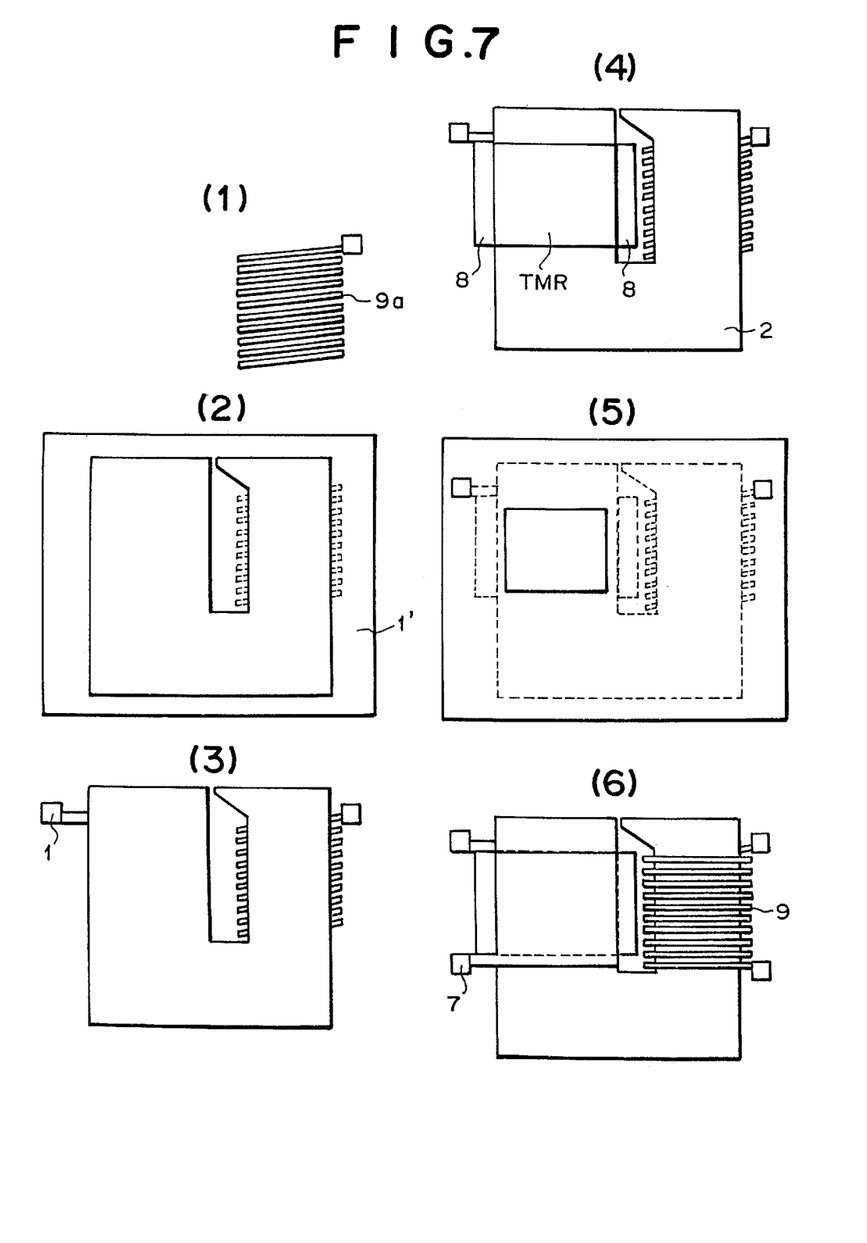
FIG. 7 is a process diagram showing an embodiment of the method of manufacturing the magnetic head of FIG. 3.

FIG. 7 shows an embodiment of the method of manufacturing the magnetic head of FIG. 3.

As shown in FIG. 7(1), a lower side portion 9a of a coil which will be wound around a magnetic yoke is formed on a substrate obtained by forming an alumina film on a composite ceramic member of $Al_2O_3$ and TiC which will serve as a slider (the substrate exists behind the coil lower side portion 9a in FIG. 7). The coil lower side portion 9a may be formed by forming a desired pattern groove in the alumina film, forming a Cu seed layer on the alumina film through a sputtering treatment, depositing Cu through an electroplating treatment, and polishing the Cu film obtained and removing Cu of the portion other than the coil pattern for flattening through a chemical and mechanical polishing treatment (CMP). Thereafter, an alumina film is formed over all the surface to insulate the coil lower side portion 9a and the magnetic yoke which will be afterward formed.

Subsequently, as shown in FIG. 7(2), a Cu film 1' serving as a lower side electrode of a pair of electrodes between which TMR and the magnetic yoke are sandwiched is formed. On the Cu film 1' are successively formed an NiFe film serving both as the magnetic yoke and as a first magnetic layer of TMR, an alumina film serving as a magnetic separation layer, a Co film serving as a second magnetic layer and a PtMn film serving as an antiferromagnetic layer. These films and layers are patterned in the same shape as the magnetic yoke 2 serving as the lower side electrode. At this time, the magnetic gap is equal to a small value ranging from 0.03 $\mu$m to 0.5 $\mu$m, and thus it is preferably formed by using a focused ion beam. Subsequently, as shown in FIG. 7(3), the Cu film 1' is patterned in a desired shape to form the lower side electrode 1.

Subsequently, as shown in FIG. 7(4), a permanent magnet film 8 of CoPt for applying a bias magnetic field to the first magnetic layer 3 of TMR is formed, and further an alumina film serving as a magnetic separation layer 4, a Co film serving as a second magnetic layer 5 and a PtMn film serving as an antiferromagnetic layer 6 are patterned in a desired shape.

Subsequently, as shown in FIG. 7(5), after the overall body is covered by an alumina insulating film, the connection portion of the coil lower side portion which will be connected to the coil upper side portion, the coil electrode end portion, the end portion of the lower side electrode and the alumina insulating film on the TMR pattern are removed to form corresponding openings.

Subsequently, as shown in FIG. 7(6), a Cu film is formed over all the surface so as to be filled in the openings formed in the step of FIG. 7(5), and then the Cu film is patterned in a desired shape to form an upper electrode 7 of 1Z1R. In addition, the coil upper side portion is formed and connected to the coil lower side portion to form a coil 9, thereby obtaining the magnetic head shown in FIG. 3.

According to the method of manufacturing the magnetic head of the above embodiment, the magnetic yoke serves as the first magnetic layer of the TMR, so that the manufacturing can be easily performed.

[Seventh Embodiment]

Figure 8:
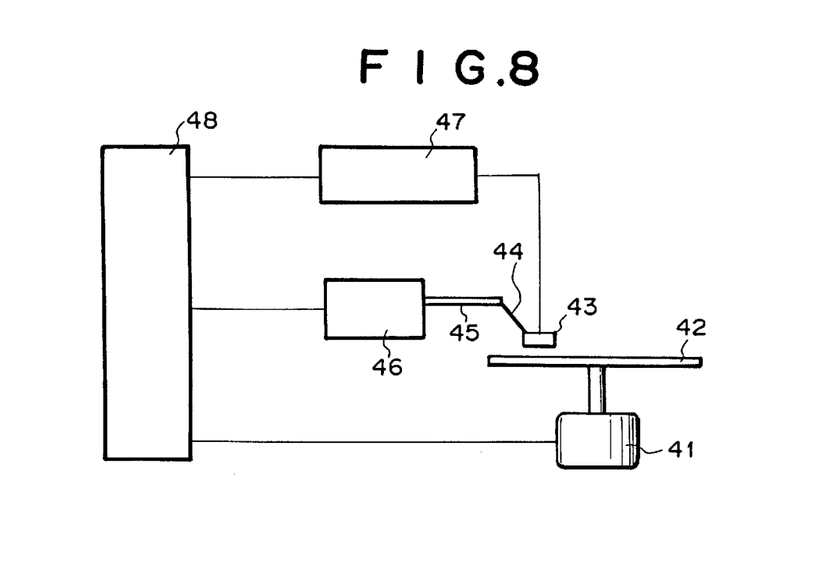
FIG. 8 is a diagram showing an embodiment of a magnetic recording/reproducing apparatus using a magnetic head according to the present invention.

FIG. 8 shows the construction of an embodiment of a magnetic recording/reproducing apparatus using the magnetic head according to the present invention.

In FIG. 8, a head 43 of the present invention is disposed so as to confront the magnetic recording surface of a magnetic recording medium 42 which is rotated by a driving motor 41. The head 43 is supported by support means containing a suspension 44 and an arm 45, and tracked by a voice coil motor (VCM) 46. The recording/reproducing operation is carried out on the basis of signals from a recording/reproducing channel 47. The recording/reproducing channel 47, VCM 46 for positioning the head and the driving motor 41 for rotating the medium are controlled by a control unit 48.

Figure 9:
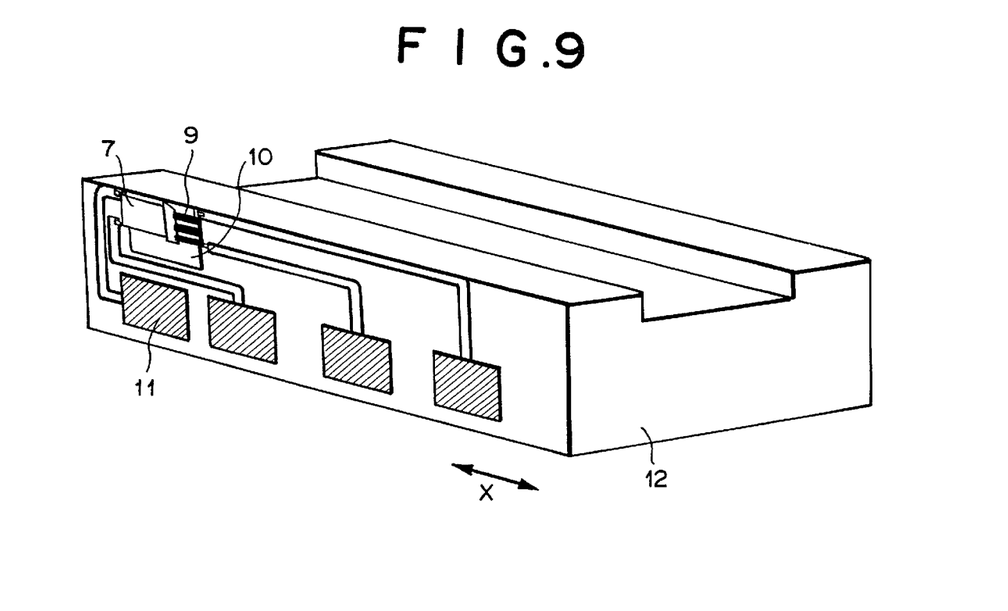
FIG. 9 is a perspective view showing the magnetic head used in the apparatus shown in FIG. 8.

FIG. 9 is a perspective view showing the magnetic head used in the magnetic recording/reproducing apparatus of the present invention.

In FIG. 9, any one magnetic head element 10 of the first to fourth embodiments is formed on the side surface of a slider 12 obtained by forming an alumina film on a composite ceramic body of $Al_2O_3$ and TiC, and four terminals 11 which are connected to the electrodes of the coil 9 and the electrodes 1, 7 of TMR are connected to the recording/reproducing channel 47. The magnetic head thus constructed is movable in the direction of an arrow X relative to the magnetic recording medium.

As the magnetic recording medium 42 used in the magnetic recording/reproducing apparatus having the above basic construction may be exemplified a disc-shaped medium comprising a high-hardness substrate of glass or aluminum and a magnetic recording layer which is formed as a magnetic thin film on the substrate by a physical vapor deposition method such as sputtering method or the like.

Figure 13:
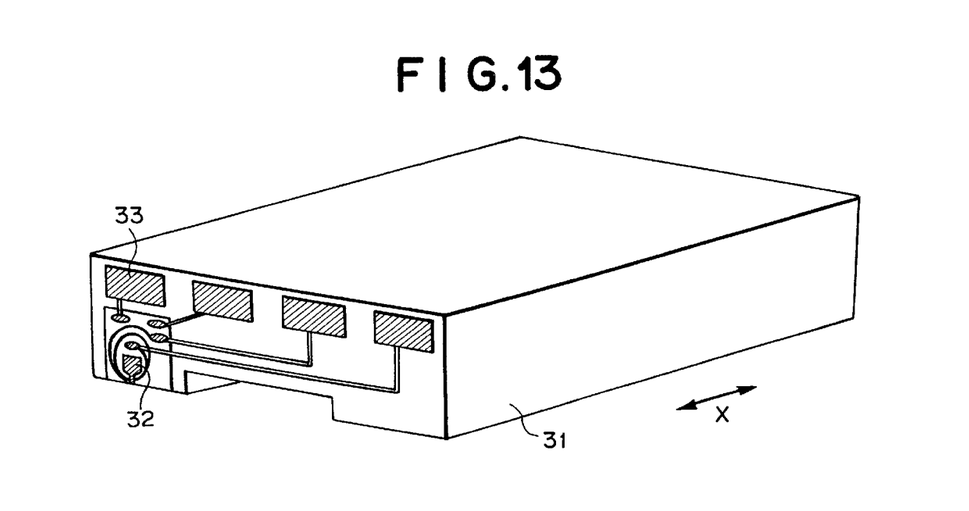
FIG. 13 is a diagram showing a conventional MR head.

Use of the magnetic head shown in FIG. 9 makes it possible to implement a recording/reproducing apparatus having a stable recording/reproducing system which suffers no thermal asperity even in a case where the gap between the medium 42 and the head 43 is equal to 40 nm or less. On the other hand, in the case of use of a conventional magnetic head shown in FIG. 13, the thermal asperity occurs frequently in the area where the gap between the medium and the head is equal to 40 nm or less. The head of FIG. 13 is a composite magnetic head described with reference to FIGS. 14 and 15, and has a recording/reproducing element 32, an electrode terminal 33 and a slider 31 as shown in FIGS. 14 and 15. The head is designed to be movable in the direction of the arrow X relatively to the magnetic recording medium.

[Eighth Embodiment]

Figure 10:
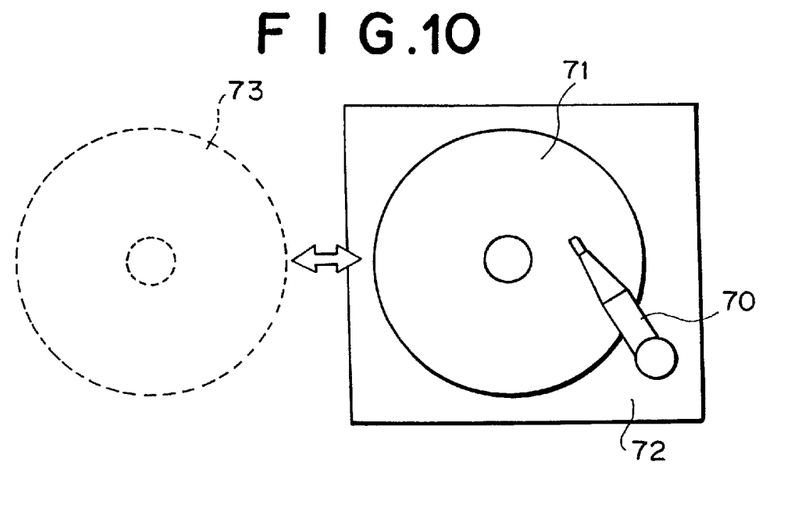
FIG. 10 is a diagram showing an embodiment of the magnetic recording/reproducing apparatus which is suitably applied to a case where flexible magnetic recording medium is used.

A flexible magnetic recording medium obtained by forming a magnetic recording layer on a substrate of polyethyleneterephthalate or the like may be used as the magnetic recording medium 42 used in the magnetic recording/reproducing apparatus having the basic construction of FIG. 8. FIG. 10 shows an apparatus which is suitably used when the above material is used.

In FIG. 10, a magnetic recording medium 71 is subjected to recording/reproducing by an assembly 70 having a magnetic head installed therein, and it is detachably mounted in an apparatus 72 (in FIG. 10, the magnetic recording medium mounted in the apparatus 72 is represented by reference numeral 71, and the magnetic recording medium detached from the apparatus 72 is represented by reference numeral 73). Use of the magnetic head shown in FIG. 9 makes it possible to implement a recording/reproducing apparatus having a stable recording/reproducing system which has no thermal asperity even in a case where the gap between the medium and the head is equal to 40 nm or less.

The magnetic recording layer of the magnetic recording medium 71 may be a magnetic recording layer coated with magnetic particles or a magnetic thin film formed by a physical vapor deposition method such as sputtering method or the like.

[Ninth Embodiment]

Figure 11:
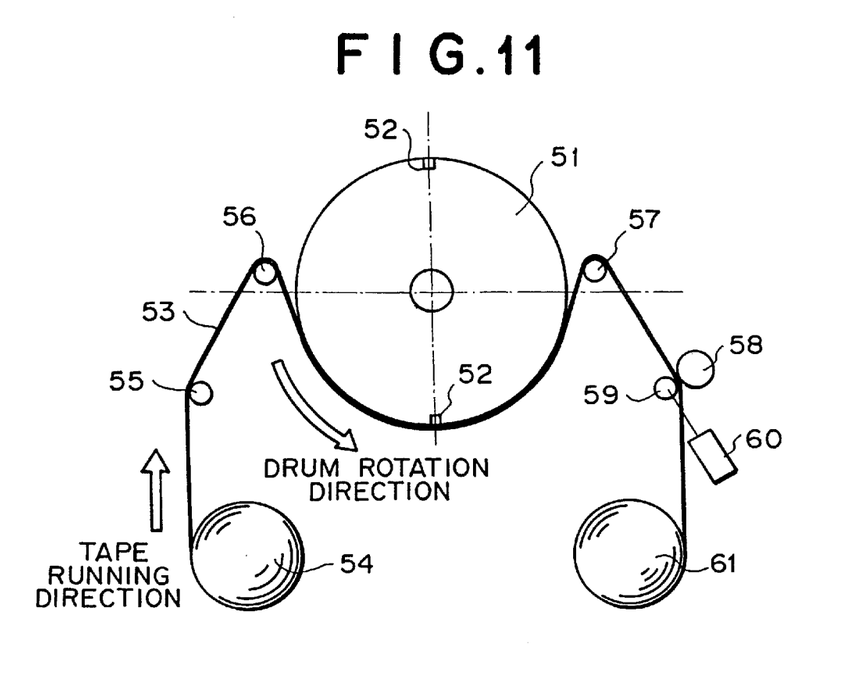
FIG. 11 is a diagram showing an embodiment of a magnetic recording/reproducing apparatus which is suitably applied to a case where a tape-shaped member is used as the magnetic recording medium.

FIG. 11 shows the construction of a magnetic recording/reproducing apparatus suitably used when a flexible and tape-shaped magnetic recording medium obtained by forming a magnetic recording layer on a substrate of polyethyleneterephthalate or the like is used. The magnetic recording layer may be a magnetic recording layer coated with magnetic particles, or a magnetic thin film formed by a physical vapor deposition method such as a sputtering method or the like. In the apparatus of this embodiment, a tape-shaped magnetic recording medium 53 supplied from a tape supply reel 54 runs under the control of rollers 55, 56, 57 and 58 and a capstan 59 whose rotational number is controlled by a capstan motor 60. The magnetic recording medium 53 is brought into stable contact with the side surface of a rotational drum 51 on which the magnetic head 52 is mounted, and finally wound up by a take-up reel 61.

Figure 12:
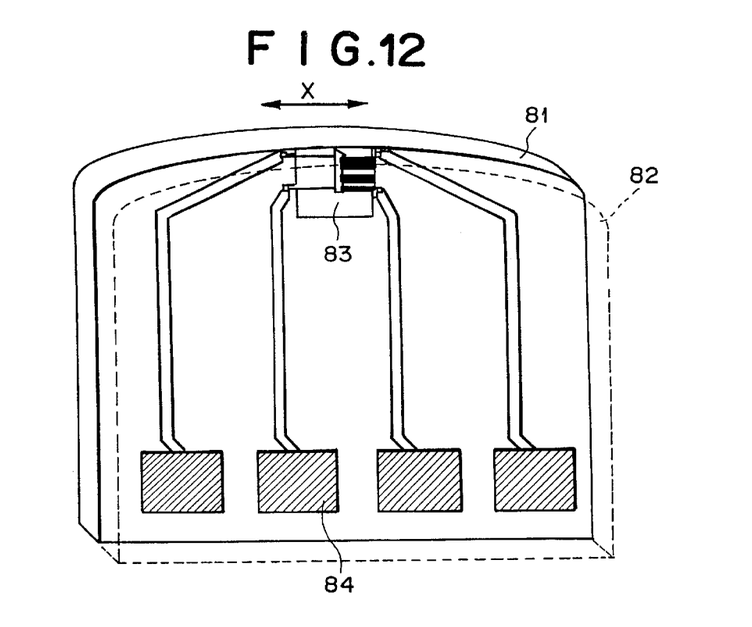
FIG. 12 is a diagram showing a magnetic head used in the apparatus of FIG. 11.

FIG. 12 shows the construction of the magnetic head to which the apparatus of the present invention is applied. An element 83 for carrying out the recording/reproducing operation has the construction of any one of the first to fourth embodiments, and it is formed on a substrate 81 serving as a slider and protected by a protection film 82 of alumina. Further, a terminal 84 for supplying recording current/reproducing current is formed. The curved surface portion at the upper portion of FIG. 12 is brought into smooth contact with the tape-shaped magnetic recording medium, however, a thin air layer is formed between the head and the medium due to the relative speed between the head and the medium. In the apparatus of this embodiment, a stable recording/reproducing system having no thermal asperity can be implemented even when the thickness of the air layer is equal to 40 nm or less.

What is claim is:

1. A magnetic head comprising:
    a magnetic yoke film forming a closed magnetic circuit containing a magnetic gap;
    a first magnetic layer which is laminated on said magnetic yoke film and magnetically coupled to said magnetic yoke film;
    a second magnetic layer laminated on said first magnetic layer through a magnetic separation layer; and
    a pair of electrodes which are formed so that a laminate comprising said magnetic yoke film, said first magnetic layer, said magnetic separation layer and said second magnetic layer is sandwiched therebetween, wherein a bias magnetic field is applied to said first magnetic layer by a permanent magnet film disposed adjacent to said first magnetic layer in respect of the direction parallel to a surface of said first magnetic layer, and a magnetic signal in said magnetic yoke film is detected by using a magnetoresistance effect based on the difference between the magnetization direction of said first magnetic layer and the magnetization direction of said second magnetic layer.

2. The magnetic head as claimed in claim 1, wherein the magnetization direction of said second magnetic layer is fixed.

3. The magnetic head as claimed in claim 2, wherein the magnetization direction of said second magnetic layer is fixed by laminating an antiferromagnetic layer on said second magnetic layer.

4. The magnetic head as claimed in claim 1, wherein said magnetic separation layer is formed of insulator, tunnel current is made flow between said pair of electrodes through said magnetic separation layer, and there is used a ferromagnetic tunnel magnetoresistance effect that the tunnel current is varied in accordance with variation of the difference between the magnetization direction of said first magnetic layer and the magnetization direction of said second magnetic layer.

5. The magnetic head as claimed in claim 1, wherein a coil is wound around said magnetic yoke film.

6. A magnetic recording/reproducing apparatus for recording/reproducing information through a magnetic head on/from a magnetic recording medium, wherein said magnetic head is the magnetic head as claimed in claim 1, and said magnetic head is movable in a direction parallel to the surface of said magnetic yoke film relative to said magnetic recording medium.

7. The magnetic recording/reproducing apparatus as claimed in claim 6, wherein the information is recorded/reproduced while the gap between the magnetic recording medium and the magnetic head is kept to be 40 nm or less.

8. The magnetic recording/reproducing apparatus as claimed in claim 6, wherein the magnetic recording medium is a flexible tape-shaped medium obtained by forming a magnetic recording layer on a flexible substrate.

9. The magnetic recording/reproducing apparatus as claimed in claim 8, wherein the magnetic recording layer is a magnetic thin film formed by a physical vapor deposition method.

10. The magnetic recording/reproducing apparatus as claimed in claim 6, wherein the magnetic recording medium is a flexible disc-shaped medium obtained by forming a magnetic recording layer on a flexible substrate.

11. The magnetic recording/reproducing apparatus as claimed in claim 10, wherein the magnetic recording layer is a magnetic thin film formed by a physical vapor deposition method.

12. The magnetic recording/reproducing apparatus as claimed in claim 6, wherein the magnetic recording medium is a medium obtained by forming a magnetic recording layer on a substrate of a rigid body.

13. The magnetic recording/reproducing apparatus as claimed in claim 12, wherein the magnetic recording layer is a magnetic thin film formed by a physical vapor deposition method.

14. A magnetic head comprising:
    a magnetic yoke film forming a closed magnetic circuit containing a magnetic gap, said magnetic yoke film also serving as a first magnetic layer;
    a second magnetic layer laminated on said first magnetic layer through a magnetic separation layer; and
    a pair of electrodes formed so that a laminate comprising said first magnetic layer, said magnetic separation layer and said second magnetic layer is sandwiched by said electrodes, wherein a bias magnetic field is applied to said first magnetic layer by a permanent magnet film disposed adjacent to said first magnetic layer in respect of the direction parallel to a surface of said first magnetic layer, and a magnetic signal in said magnetic yoke film is detected by using a magnetoresistance effect based on the difference between the magnetization direction of said first magnetic layer and the magnetization direction of said second magnetic layer.

15. The magnetic head as claimed in claim 14, wherein the magnetization direction of said second magnetic layer is fixed.

16. The magnetic head as claimed in claim 15, wherein the magnetization direction of said second magnetic layer is fixed by laminating an antiferromagnetic layer on said second magnetic layer.

17. The magnetic head as claimed in claim 14, wherein said magnetic separation layer is formed of insulator, tunnel current is made flow between said pair of electrodes through said magnetic separation layer, and there is used a ferromagnetic tunnel magnetoresistance effect that the tunnel current is varied in accordance with variation of the difference between the magnetization direction of said first magnetic layer and the magnetization direction of said second magnetic layer.

18. The magnetic head as claimed in claim 14, wherein a coil is wound around said magnetic yoke film.

19. A magnetic recording/reproducing apparatus for recording/reproducing information through a magnetic head on/from a magnetic recording medium, wherein said magnetic head is the magnetic head as claimed in claim 14, and said magnetic head is movable in a direction parallel to the surface of said magnetic yoke film relative to said magnetic recording medium.

20. The magnetic recording/reproducing apparatus as claimed in claim 19, wherein the information is recorded/reproduced while the gap between the magnetic recording medium and the magnetic head is kept to be 40 nm or less.

21. The magnetic recording/reproducing apparatus as claimed in claim 19, wherein the magnetic recording medium is a flexible tape-shaped medium obtained by forming a magnetic recording layer on a flexible substrate.

22. The magnetic recording/reproducing apparatus as claimed in claim 21, wherein the magnetic recording layer is a magnetic thin film formed by a physical vapor deposition method.

23. The magnetic recording/reproducing apparatus as claimed in claim 19, wherein the magnetic recording medium is a flexible disc-shaped medium obtained by forming a magnetic recording layer on a flexible substrate.

24. The magnetic recording/reproducing apparatus as claimed in claim 23, wherein the magnetic recording layer is a magnetic thin film formed by a physical vapor deposition method.

25. The magnetic recording/reproducing apparatus as claimed in claim 19, wherein the magnetic recording medium is a medium obtained by forming a magnetic recording layer on a substrate of a rigid body.

26. The magnetic recording/reproducing apparatus as claimed in claim 25, wherein the magnetic recording layer is a magnetic thin film formed by a physical vapor deposition method.

* * * * *